United States Patent
Fehse

(10) Patent No.: US 7,363,210 B2
(45) Date of Patent: Apr. 22, 2008

(54) METHOD AND COMMUNICATIONS SYSTEM FOR MANAGING, SUPPLYING AND RETRIEVING DATA

(75) Inventor: Michael Fehse, Nauheim (DE)

(73) Assignee: Deutsche Telekom AG, Bonn (DE)

( * ) Notice: Subject to any disclaimer, the term of this patent is extended or adjusted under 35 U.S.C. 154(b) by 289 days.

(21) Appl. No.: 10/948,063

(22) Filed: Sep. 23, 2004

(65) Prior Publication Data

US 2005/0165756 A1  Jul. 28, 2005

(30) Foreign Application Priority Data

Sep. 23, 2003  (DE) ................................. 103 45 016

(51) Int. Cl.
*G06F 13/12* (2006.01)

(52) U.S. Cl. .................. 703/21; 709/225; 709/203; 709/253; 709/230; 370/295.5; 370/401; 370/469; 710/3; 703/21

(58) Field of Classification Search ................ 709/230, 709/253, 203, 217, 223; 370/395.5, 401; 710/3
See application file for complete search history.

(56) References Cited

U.S. PATENT DOCUMENTS

| | | | | |
|---|---|---|---|---|
| 2003/0208638 A1* | 11/2003 | Abrams et al. | ............. | 709/328 |
| 2004/0010545 A1* | 1/2004 | Pandya | ........................ | 709/203 |
| 2004/0010612 A1* | 1/2004 | Pandya | ........................ | 709/230 |
| 2004/0030757 A1* | 2/2004 | Pandya | ........................ | 709/217 |
| 2004/0030770 A1* | 2/2004 | Pandya | ........................ | 709/223 |
| 2004/0030806 A1* | 2/2004 | Pandya | ........................ | 709/250 |
| 2004/0037299 A1* | 2/2004 | Pandya | ........................ | 370/401 |
| 2004/0037319 A1* | 2/2004 | Pandya | ........................ | 370/469 |
| 2004/0064590 A1* | 4/2004 | Starr et al. | ................... | 709/250 |
| 2004/0103220 A1* | 5/2004 | Bostick et al. | .............. | 709/253 |
| 2004/0111523 A1* | 6/2004 | Hall et al. | ................... | 709/230 |
| 2004/0117438 A1* | 6/2004 | Considine et al. | .......... | 709/203 |
| 2004/0133634 A1* | 7/2004 | Luke et al. | .................. | 709/203 |
| 2004/0139240 A1* | 7/2004 | DiCorpo et al. | ............... | 710/3 |
| 2004/0148376 A1* | 7/2004 | Rangan et al. | .............. | 709/223 |
| 2004/0199618 A1* | 10/2004 | Knight et al. | ............... | 709/223 |
| 2004/0233910 A1* | 11/2004 | Chen et al. | ............. | 370/395.5 |

\* cited by examiner

*Primary Examiner*—Kamini Shah
*Assistant Examiner*—Cuong Van Luu
(74) *Attorney, Agent, or Firm*—Kenyon & Kenyon LLP

(57) ABSTRACT

A method and communications system for managing and supplying data in a communications environment, which may have a data-management device, several application servers that may communicate with the central data-management device via different communications protocols, and storage devices based on FC (Fiber Channel) and IP (Internet Protocol) technology. To provide the entire range of storage devices of different technologies to application servers that use different communications protocols, an application server may request data, which may be distributed among several storage devices of different technologies, using a specific communications protocol for an application to be carried out. The requested data are fetched out of at least one storage device, independently of the utilized communications protocol of the application server, and may be transmitted via the data-management device to the application server requesting the data, for further use, using its communications protocol.

7 Claims, 2 Drawing Sheets

METHOD AND COMMUNICATIONS SYSTEM FOR MANAGING, SUPPLYING AND RETRIEVING DATA

FIELD OF THE INVENTION

The present invention relates to a method and a communications system for managing and supplying data in computer networks.

RELATED TECHNOLOGY

In the age of information technology, the collection, processing, and distributing of information play a special role. With the aid of locally bounded computer networks (LAN, MAN), long-range networks (WAN), as well as a group of individual computer networks, e.g. the Internet, it can be possible to provide a large number of users with all information stored on a storage medium. Although the available information should be provided to as many users as desired, it has, till now, not been necessarily possible to find uniform standards regarding the transmission technology, network access protocols, computer interfaces, and the like. On the contrary, computer networks have been characterized in that heterogeneous sub-networks, as well as hardware and software components of different manufacturers, are used, so that a transparent data exchange should use interconnecting suitable adaptation and conversion devices, e.g., in the form of gateways and bridges.

In addition, there are so-called dedicated computer systems, in which each application server is assigned, via a database server, a storage device in the form of a database or distributed databases. Such a computer system is represented in FIG. 1. As FIG. 1 shows, a client 1 is permanently assigned to a storage device 4 via an application server 2 and a database server 3. A second dedicated computer system includes a client 5, which is permanently assigned to a storage device 8 via an application server 6 and a database server (DBS) 7. In such dedicated computer environments, a transparent flow of data may be rendered possible by using suitable adaptation or interface devices in the application server, the database server, and/or the database, or by using only components of the same manufacturer. However, in such dedicated systems, e.g., application server 2 cannot access storage device 8, or application server 6 cannot access storage device 4.

SUMMARY OF THE INVENTION

An embodiment of the present invention provides a method and a communications system which can supply data from arbitrarily implemented storage devices to application servers that operate using different communications protocols.

An embodiment of the present invention provides at least one data-management device, which is, e.g., a computer network that forms a data-abstraction layer for application servers able to be connected to the data-management device. The data-abstraction layer of the data-management device assures that the application server no longer need be concerned with, in which storage locations of one or more databases the requested data are situated, and in which format the data are present. Rather, with regard to an application to be carried out, an application server requests the data, which is necessary for the application and is then provided to the application server as a complete message, via the data-abstraction layer. The data-management device assumes the collecting, distributing, converting, and systematic storing of data, i.e., all of the data management.

Although the data-management device may be a computer network containing several sub-networks, one may refer to the entire communications system as a central device.

The present invention provides a method for managing and supplying data in a communications environment.

The communications environment has at least a data-management device, several application servers which may communicate with the data-management device via various communications protocols, and storage devices based on FC (Fiber Channel) and IP (Internet Protocol) technology. A storage device may be an individual database, distributed databases, or entire storage networks.

According to the method, an application server requests data for an application to be carried out, using a specific communications protocol, such as the Internet Protocol (IP) or the protocol based on the Fiber Channel (FC), the data being able to be distributed among several differently designed storage devices. The requested data are fetched out of at least one storage device, independently of the utilized communications protocol of the application server, and transmitted via the data-management device to the application server requesting the data, for further use, using its communications protocol. In this manner, the data-management device forms a data-abstraction layer for the application server accessing the data-management device, for with the aid of the data-management device, the requested data are transmitted to an application server in a "palatable" manner or in "bite-sized pieces."

In order to allow memory management, the data-management device may map or reproduce available and occupied memory locations or units of the utilized storage devices on a virtual memory, also known as a data pool. In this manner, the utilized storage devices may be optimized, since the data-management device has knowledge of how much free storage space is available altogether and/or in the specific storage devices.

The data-management device may be able to optimally store data to be stored, on a particular storage device, according to the requested storage space, or it is able to selectively distribute the data to be stored to a plurality of storage devices.

In addition, it may be possible to virtually change, e.g., to increase, the storage capacity of one or more storage devices as a function of the capacity utilization of the remaining storage devices. Thus, it is even possible to increase the storage capacity of a storage device during operation, on the basis of an inquiry, when sufficient memory space is available in one or more other storage devices.

In order to be able to back up data, even during operation, the data-management device may save data on the storage devices that are switched on and may be widely distributed, according to the storage architecture design known as RAID (Redundant Area of Inexpensive Disks). The storage architecture known as RAID is principally used in an individual server, in that the data to be backed up are divided up into small blocks and distributed among several storage disks. Therefore, with the aid of the data-management device, the storage devices, which are switched on and usually spread over a wide area, may be managed as individual storage disks accommodated in a computer housing or an enclosure. Thus, a storage architecture referred to as mirroring, in which one-hundred percent redundancy in the data is generated, is not necessary but still possible.

In further embodiments, data backup for an application running on an application server may also be carried out during operation, on an external data backup device, e.g., a magnetic tape device, while the data-management device is controlled. Such a data backup operation is also known as backup operation. Therefore, the backing-up and restoring of the backed-up data is independent of the application and transparent.

The communications system includes a data-management device, several application servers which may access the data-management device via different interfaces, as well as several storage devices which are based on FC (Fiber Channel) and IP (Internet Protocol) technology and are connected to the data-management device. The data-management device has a first FC switching device (Fiber Channel switch), which is assigned to at least one application server having a FC-based interface. In addition, a first IP switching device (Internet protocol switch) is provided, which is assigned to at least one application server having an IP-based interface. A second FC switching device is assigned to at least one storage device based on an FC technology. An adaptation device is used for adapting the data coming from the first IP switching device to the data format of the second FC switching device, and vice versa.

The application servers assigned to the first IP switching device may have any database interface, e.g. a DB2 interface, iSCSI (Internet Small Computer System Interface over IP) interface, CIFS (Common Internet File System) interface, NFS interface, SOAP/XML (Simple Object Access Protocol/Extensible Markup Language) interface, and/or a J2EE (Java 2 Platform Enterprise Edition) interface. What these interfaces or protocols have in common is, that they can transmit and receive data using the IP protocol.

In an embodiment, a database (DB), J2EE, and SOAP-Router are provided, which are connected to the first IP switching device, the routers each being assigned at least one corresponding server, which are connected, in turn, to the adaptation device.

The adaptation device may be a file server (filer), namely, e.g., a filer of the company Network Appliance. Such a filer is able, inter alia, to adapt IP protocols and FC protocols in such a manner that, for example, an application server connected to the data-management device via an iSCSI interface may transmit data, which are stored in a FC-based storage device.

The data-management device advantageously has a database server, which can act as a J2EE server. In this manner, the data-management device may provide users with WEB-based corporate or business applications.

The data-management device according to the present invention, which, as mentioned, may constitute a computer network, may be constructed of known database servers, networks, switching devices, file servers, and the like.

In order to render the backing-up of data possible, the second FC switching device is assigned at least one data-backup device. The data-management device is designed so that during the operation of an application server, data can be backed up by the data-backup device.

The data-management device may have a control and/or administrative unit, which is designed, in particular, to restore data, to protocol the data traffic between application servers and storage devices, to bill for provided services, and to optimize the storage devices. The data-management device may automatically carry out the corresponding management while functioning in response to predetermined rules.

In order to increase the flexibility of the communications system, the data-management device may have a second IP switching device, which is assigned to storage devices based on IP technology. In addition, an adaptation device is provided, which is designed to adapt the data coming from the first FC switching device to the data format of the second IP switching device, and vice versa.

The adaptation devices may be implemented in separate file servers or in the above-mentioned file server.

The present invention allows rigid or fixed assignments between an application server and a database to be eliminated, in that different application servers may now access mixed storage environments, which may be based on FC or IP technology. In other words, the data-management device may allow virtual data management, in which data is transmitted to application servers without the application server having to be informed about the storage devices involved. This also means that the utilized storage devices may provide their services to application servers in a more flexible, efficient, and cost-effective manner.

DETAILED DESCRIPTION

Figure 1:
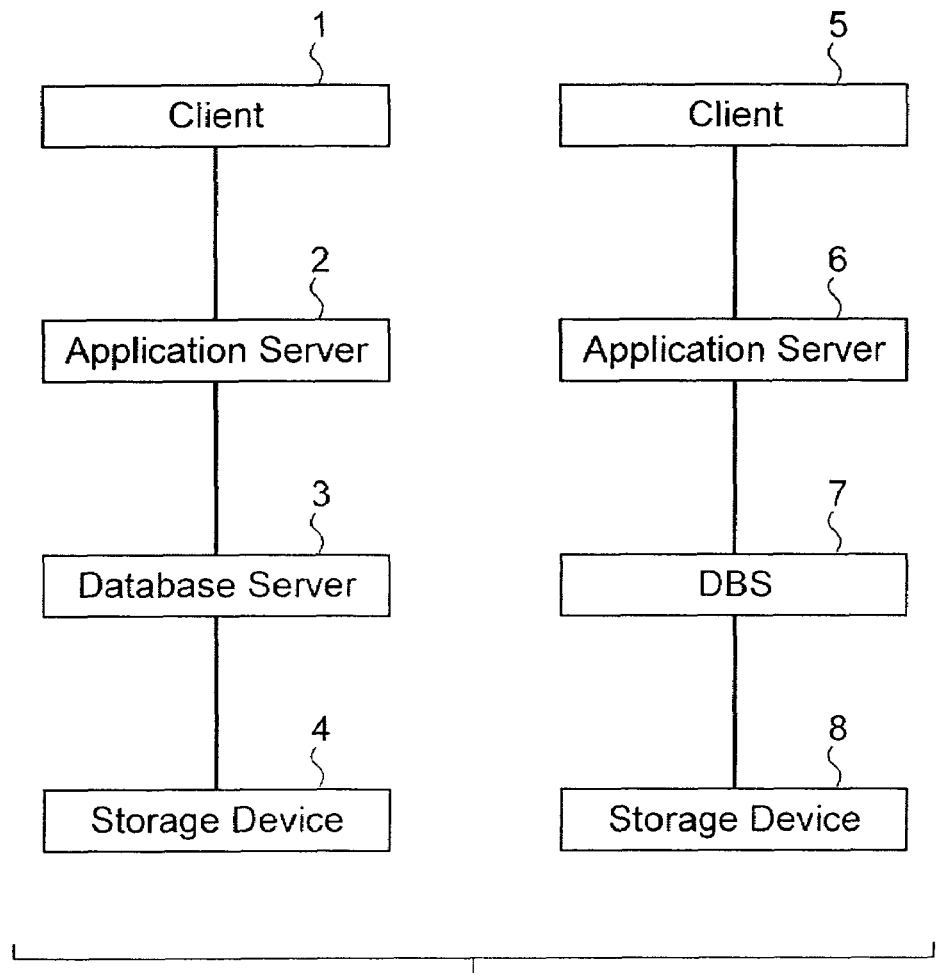
FIG. 1 shows a communications architecture, in which two application servers are each rigidly assigned to a storage device.
Figure 2:
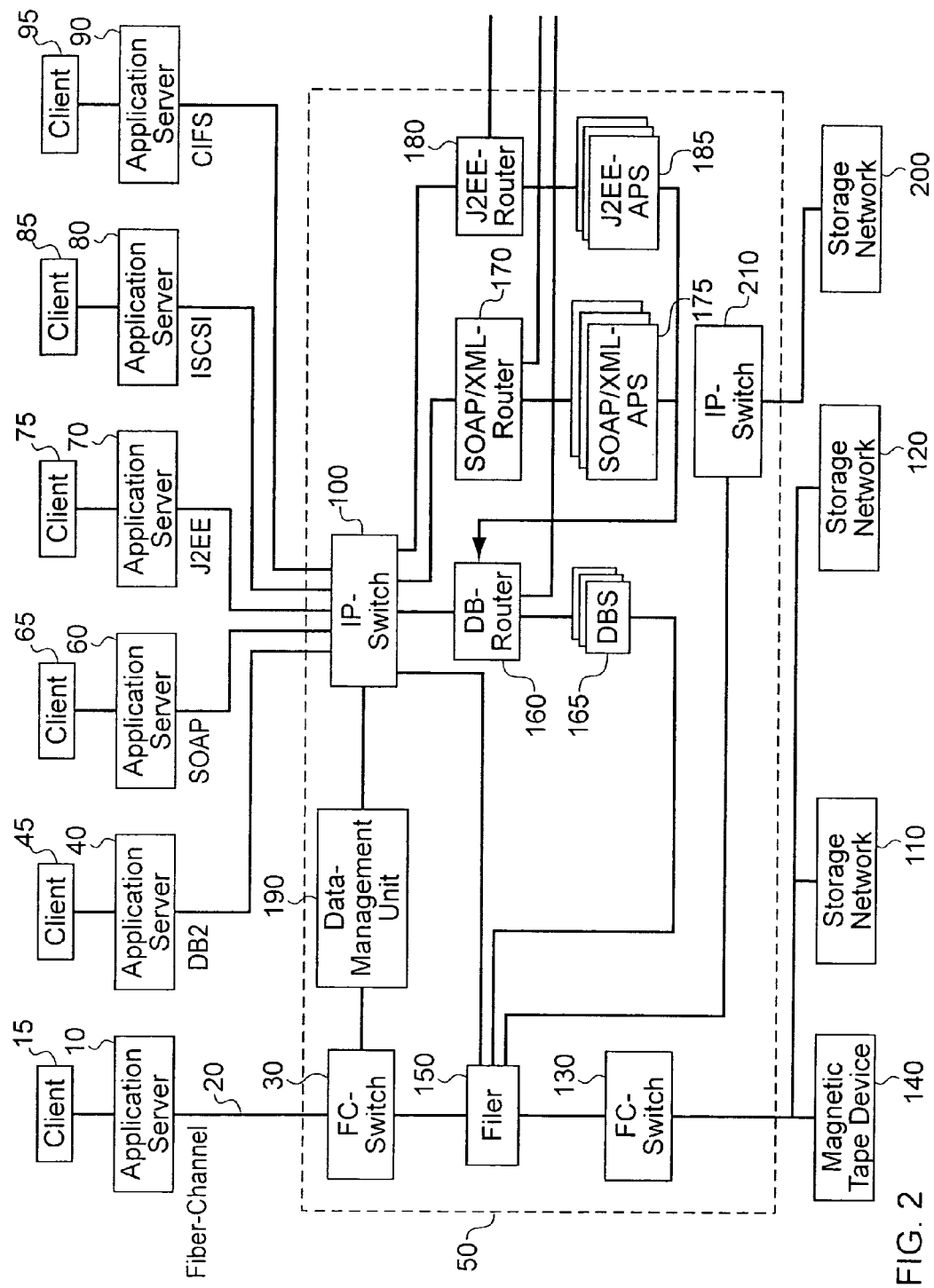
FIG. 2 shows a communications system, which has a different application server and storage devices, and in which the present invention is implemented.

Shown in FIG. 2 is a communications environment, which has an application server 10 that possesses a FC interface. Application server 10 may be assigned a client 15. Application server 10 is connected to a FC switch 30 via a fiber channel 20.

FC switch 30 is part of an exemplarily represented computer network, which is referred to in the following as central data-management device 50. The communications environment also has an application server 40 having a DB2 interface. An application server 60 has a so-called SOAP/XML interface, while an application server 70 has a J2EE interface. A further application server 80 may be provided, which has an iSCSI interface. A CIFS interface is implemented in a further application server 90. Application servers 40, 60, 70, 80, and 90 are assigned, for example, clients 45, 65, 75, 85, and 95, respectively. Application servers 40, 60, 70, 80, 90 distinguish themselves in that they may exchange data with an IP switch 100 of central data-management device 50, using the Internet protocol (IP).

FC switch 30 and IP switch 100 of data-management device 50 form, inter alia, a so-called data-abstraction layer, via which requested data are transmitted to assigned application servers 10, 40, 60, 70, 80, and 90. The data may be stored in different storage devices. In our example, storage networks 110, 120, and 200 constitute the storage devices. An individual database may also be a storage device. Storage networks 110 and 120 may be known storage networks, which are constructed using the fiber channel technology. Therefore, storage networks 110 and 120 are connected to a FC switch 130 of central data-management device 50. Storage network 200 may be constructed, using an IP technology. Consequently, storage network 200 is connected to an IP switch 210 of central data-management device 50. IP switch 210 is connected, in turn, to filer 150. Filer 150 is also used as a converter of FC-based data formats to IP-based data formats, and vice versa.

A magnetic tape device 140, which provides for the required backing-up of data, may also be connected to FC switch 130.

In order that application servers 10, 40, 60, 70, 80 and 90 do not have to be concerned about the technology and the structure of utilized storage networks 110, 120, and 200, as well as the respective data formats, IP switch 100 is connected to file server 150, also called a filer. Filer 150 has, inter alia, the task of processing the requests coming from one of the application servers and transmitting them to FC switch 130, which then fetches the requested data from storage networks 110 and 120 and transmits them via filer 150 to FC switch 30 or IP switch 100. FC switch 30 or IP switch 100 then transmits the data to the application server requesting the data.

In order that application server 60 connected via a SOAP/XML interface, application server 70 connected via the J2EE interface, and application server 40 connected via the DB2 interface may also access data, which are stored in storage networks 110, 120 based on the FC technology, IP switch 100 is assigned a DB router 160, a SOAP and/or XML router 170, as well as a J2EE router 180; the DB router is assigned, in turn, at least one database server 165, SOAP/XML router 170 is assigned at least one SOAP/XML application server 175, and J2EE router 180 is assigned at least one J2EE application server 185. Application servers 175 and 185 are connected to DB router 160, while database server 165 is connected to filer 150. SOAP/XML application server 175 and J2EE application server 185 are connected to DB router 160, as well. In conjunction with assigned database servers 165, DB router 160 evaluates request signals of application server 40, as well as request signals of application servers 175 and 185, in order to fetch out the data distributed among storage networks 110, 120, and/or 200 via filer 150 and FC switch 130, or via IP switch 210, and make the data available to the requesting application server.

If the request signals to DB router 160, SOAP/XML router 170, and/or J2EE router 180 cannot be processed, then the request signals may be relayed to another data-management device.

A data-management unit 190 implemented in central data-processing device 50 is connected to the components of data-processing device 50. Data-management unit 190 is used for, inter alia, backing up data on magnetic tape device 140 during the execution of an application on one or more of the application servers. Examples of further tasks of data-management unit 190 include restoring data, logging data communications, and managing and optimizing storage networks 110, 120, and 200. For example, data-management unit 190 make sure that, during operation, the storage capacity of storage network 110 is increased, so that free memory space in storage networks 120 and 200 is made available to storage network 110. To this end, the available and occupied memory units of storage networks 110, 120, and 200 are reproduced in a virtual memory, which is generated, for example, in data-management unit 190.

Data-management unit 190 is also designed for generating communications data records, in order to be able to monitor toll services and charge the user of an application server for them. Technical changes to the central data-management device and the addition or removal of further application servers and storage networks are likewise registered in data-management unit 190. Magnetic tape device 140 may also be controlled via data-management unit 190. At this point, it should be pointed out that data-management unit 190 may be a network of computers, and does not need to be an individual computer. Further tasks of data-management unit 190 may include logging existing connections between an application server and central data-management device 50, restoring lost data in the storage networks, as well as conducting data analyses in order to be able to make decisions. Therefore, data-management unit 190 may be provided with a suitable artificial intelligence, i.e., may be designed as an expert system.

Data-management device 50 also allows data to be filed in the storage networks, so as to be backed up. An application case for central data-management device 50 represented in FIG. 2 is explained below.

It is assumed that the user of client 65 would like to take out car insurance. Therefore, the user is interested in obtaining the least expensive offer. Using application server 60 assigned to client 65, a corresponding request, "least expensive car insurance," is transmitted via IP switch 100 of central data-management device 50. IP switch 100 transmits the request signal to SOAP/XML router 170, which determines which SOAP/XML application server 175 can process the request signal. Without application server 10 knowing the databases or storage networks in which relevant car-insurance data are stored, SOAP/XML application server 175 automatically induces filer 150, via DB server 165, to fetch the corresponding data out of storage network 200 and storage networks 110 and 120.

SOAP/XML application server 175 is designed to be able to select the least expensive car insurance from the received data. The corresponding data are then transmitted via IP switch 100 to application server 60 and finally to client 65, in a predetermined format which application server 60 can process. From the point of view of application server 60, data-management device 50 forms a data-abstraction layer, which provides application server 60 with the desired data, without application server 60 having to be concerned about at which locations and in which format the data of interest to it are stored.

Therefore, central data-management device 50 is able to provide a single virtual database to connected application servers 10, 40, 60, 70, 80, 90, for central data-management device 50 is designed in such manner, that it can manage arbitrarily distributed databases, even of different manufacturers, as well as storage networks that can be based on different transmission technologies, and provide the requested data to each connected application server in the format that may be processed by the specific interface of the corresponding application server.

What is claimed is:

1. A communications system for managing and supplying data between several application servers and several storage devices, comprising:
 at least one data-management device, several application servers which may access the data-management device via different interfaces, and several storage devices, which are based on Fiber Channel and Internet Protocol technology and are connected to the data-management device;
 the data-management device having the following features:
 a first Fiber Channel switching device, which is assigned to at least one application server having a Fiber Channel-based interface;
 a first Fiber Channel switching device, which is assigned to at least one application server having an Internet Protocol-based interface;
 a second Fiber Channel switching device, which is assigned to at least one storage device based on FC technology; and an adaptation device for adapting the data coming from the first Internet Protocol switching device to the data format of the second Fiber Channel switching device, and vice versa, a database router, J2EE router, and SOAP router which are connected to the first Internet Protocol switching device, the routers each being assigned at least one database server, SOAP/XML application server, and/or one J2EE application server, the database server being connected to the adaptation device, and the SOAP/XML application server and/or the J2EE application server being connected to the database route, wherein the first Internet Protocol switching device is assigned to application servers having at least one database interface, iSCSI interface, CIFS interface, SOAP/XML interface, and J2EE interface.

2. The system of claim 1, wherein one of the database router, the SOAP/XML router, and the J2EE router is connected to another data-management device.

3. The system of claim 1, wherein the second Fiber Channel switching device is assigned at least one data-backup device.

4. The system of claim 1, wherein the data-management device has a data-management unit based on rules, for at least one of restoring data, logging the data traffic, and charging for requested services, to optimize the storage devices.

5. The system of claim 1, wherein the data-management device has a second Internet Protocol switching device, which is assigned to least one storage device based on Internet Protocol technology, and an adaptation device for adapting the data coming from the first Fiber Channel switching device to the data format of the second Internet Protocol switching device, and vice versa.

6. The system of claim 1, wherein the adaptation device is implemented in one of separate file servers and a common file server.

7. The system of claim 5, wherein the adaptation devices are implemented in one of separate file servers and a common file server.

* * * * *